United States Patent [19]

Vogel

[11] Patent Number: 4,787,407
[45] Date of Patent: Nov. 29, 1988

[54] METHOD AND APPARATUS FOR THE DETECTION OF THE FLUID LEVEL IN A TANK BEING FILLED

[75] Inventor: Johannes A. Vogel, Delft, Netherlands

[73] Assignee: Shell Internationale Research Maatschappij B.V., The Hague, Netherlands

[21] Appl. No.: 82,453

[22] Filed: Aug. 7, 1987

[30] Foreign Application Priority Data

Aug. 28, 1986 [NL] Netherlands .......................... 8602189

[51] Int. Cl.⁴ ...................... G01F 23/28; F16K 31/00
[52] U.S. Cl. .................... 137/2; 73/290 V;
137/386; 137/392; 141/95; 141/286; 141/1; 367/908
[58] Field of Search ............. 137/1, 2, 386, 392; 73/290 V; 141/1 X, 94, 95, 96, 198, 286; 340/621; 367/908

[56] References Cited

U.S. PATENT DOCUMENTS

| 1,991,192 | 2/1936 | Bucky | 367/908 |
| 2,990,543 | 6/1961 | Rod | 340/621 |
| 3,184,969 | 5/1965 | Bolton | 367/908 |
| 3,223,964 | 12/1965 | Stadlin | 137/386 |
| 4,145,914 | 3/1979 | Newman | 367/908 |
| 4,470,299 | 9/1984 | Soltz | 73/290 V |
| 4,522,237 | 6/1985 | Endo et al. | 141/95 |
| 4,535,628 | 8/1985 | Hope | 340/621 |
| 4,675,854 | 6/1987 | Lau | 367/908 |

FOREIGN PATENT DOCUMENTS

| 292013 | 7/1965 | Netherlands . | |
| 0563320 | 6/1977 | U.S.S.R. | 73/290 V |
| 844878 | 8/1960 | United Kingdom | 367/908 |
| 1064180 | 11/1965 | United Kingdom . | |

Primary Examiner—George L. Walton
Attorney, Agent, or Firm—Jones, Tullar & Cooper

[57] ABSTRACT

Acoustic signals are transmitted through the fluid flow of a fuel delivery pump to a tank to be filled. From reflection signals the fluid level in the tank is detected and a timely disconnection of the pump can be effected in order to prevent fuel losses.

27 Claims, 1 Drawing Sheet

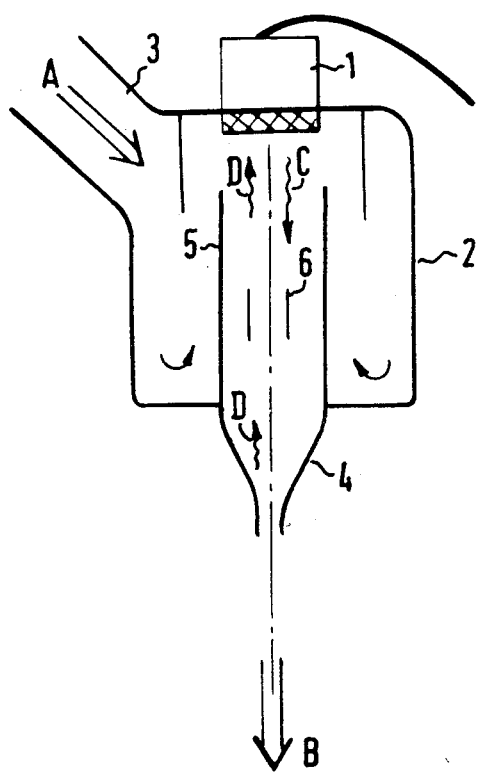

METHOD AND APPARATUS FOR THE DETECTION OF THE FLUID LEVEL IN A TANK BEING FILLED

The invention relates to a method and apparatus for detecting the fluid level in a tank or storage container, the level detection taking place during the filling of the tank and at some distance from the nozzle of a filling means.

Fluid level detection methods are used, for example, in fuel stations where the generally known filling guns or nozzles of fuel delivery pumps used to fill vehicle tanks are provided with a detection mechanism for cutting off the fuel supply.

Prior-art detection methods are based on a valve mechanism with partial vacuum which responds to contact of the filling gun nozzle with the liquid in the tank.

In a number of situations, however, this known detection method is found to respond too late, so that spillage losses occur, or it leads to undesired premature cutoff due to the strong foaming action of the known feed mechanism. It is therefore an object of the invention to provide a method and apparatus with which the level in the tank being filled can be detected at an early stage, so that spillage and premature cutoff is prevented and the tank can be filled more rapidly.

The present invention therefore provides a method for detecting the fluid level in a tank or storage container being filled, the fluid level being detected at a distance in front of the opening of a filling means, characterized in that an acoustic signal is passed from a transmitter through the fluid flow from the filling means to the fluid in the tank or storage container being filled, and the echo signal resulting from the reflection of the transmitted acoustic signal at the fluid surface in the tank or storage container is passed back through the fluid flow from the filling means to a receiver, thereby enabling the fluid level in the tank or storage container to be detected.

The invention further provides an apparatus for detecting the fluid level in a tank or storage container being filled, the fluid level being detected at a distance in front of the opening of a filling means, characterized in that an acoustic transmitter and a receiver are present, as well as means for passing acoustic signals through the fluid flow from the filling means to and from the fluid surface in the tank or storage container being filled, and that means are present for detecting the fluid level in the tank or storage container being filled from the acoustic signals passed back from the fluid surface in the tank or storage container through the fluid flow from the filling means to the receiver.

The invention is based on the principle of acoustic detection, known per se, by which an acoustic pulse or wave is transmitted to the fluid surface in a tank and the reflections of the acoustic pulse or wave against the fluid surface are received and detected in the form of echo signals. This principal, known per se, will not be described in detail.

The present invention provides a novel method of acoustic detection, whereby the fluid level in the tank being filled is detected at some distance from the nozzle of a filling means, so that measures for cutting off the fluid feed can be taken in time and spillage can be prevented.

The invention will now be explained by way of example in more detail with reference to the accompanying drawing in which: the FIGURE shows a longitudinal section of an acoustic input means that passes acoustic pulses or waves through the filling fluid, such as fuel from a fuel pump. The acoustic input means can be fitted in any suitable way in the filling means (not shown for reasons of clarity).

Referring to the FIGURE, an acoustic piezoelectric transducer 1 is shown, as well as a housing 2 that, for example, can be cylindrical. In an advantageous embodiment of the invention an ultrasonic transducer is used. The housing 2 is provided at a suitable point with an inlet 3 for passing fuel (arrow A) through a pump (not shown) and an outlet 4 directed (arrow B) towards a tank or storage container to be filled (not shown). The housing can be connected to the pump in any suitable manner. The fuel is then passed via the inlet 3 to the tank being filled such that the acoustic signal C from the transducer 1 is transmitted through the fuel flow.

This can, for example, be done via a circulator 5 located in the housing 2 and a flow smoother 6.

The circulator 5 is, for example, cylindrical and its function is to guide the fuel past the transducer 1 and ensure a uniform flow to the outlet 4.

At the start of the fluid supply, there will be air in the filling means. The circulator should be shaped such that the liquid flow carries away air bubbles from the transducer surface and no spaces with a low flow velocity are present, from which air bubbles escape only slowly.

In order to prevent a twisting motion in the liquid flow, an eccentric disc can be mounted in the circulator space (not shown for the sake of clarity). Rotating such a disc can minimize the twisting motion in the liquid flow.

The flow smoother 6 is, for example, cylindrical and its function is to influence the smoothness of the flow.

In an advantageous embodiment of the invention, a transducer can also serve as a flow smoother.

Flow smoothing should be performed such that the acoustic path is not affected.

The function of the outlet 4 is to minimize as far as possible the velocity differences in the liquid flow on leaving the filling means.

The outlet should be shaped such that the acoustic signal can pass almost unhindered.

The outlet can have any suitable form, for example a diaphragm aperture, an acoustically small aperture or a tapered aperture.

For a liquid flowing out of a very large vessel, a very smooth flow can be obtained with a small, round, sharp-edged aperture (diaphragm). This can be used particularly in situations where there is a low pressure in the vessel.

An acoustically small aperture is an aperture whose maximum dimension is not large relative to the acoustic wavelength applied.

The transition from the liquid flow passing through an acoustically small aperture to the liquid surface causes an acoustic impedance jump and thus a reflection structure for the acoustic (ultrasonic) signal.

A very advantageous embodiment has a tapering aperture. In practical embodiments, the nozzles are, for example, 6 mm, 12 mm and 18 mm.

The angle of the tapered nozzle can vary and is advantageously 4°.

It is important for the transducer 1 that sufficient acoustic energy is transmitted from the outlet to the free liquid flow and vice versa.

In an advantageous embodiment, mid frequencies of, for example, 1 MHz (wavelength 1.5 mm) and 2.25 MHz (wavelength 0.7 mm) are applied.

For an operating frequency of 2.25 MHz and a 6 mm nozzle, the transducer can, for example, have a diameter of 12 mm. The transducer can be mounted in any suitable fashion and at any suitable place, for example inside the filling gun. In addition, a drop-shaped or torpedo-shaped transducer can be fitted in the outlet in order to prevent a long acoustic path in the filling gun. Such an arrangement also has the advantage that it is possible, by means of an (acoustic) impedance measurement, to determine whether liquid or air is present at the nozzle.

It is also possible to couple the acoustic beam in the liquid flow with the aid of an (acoustic) mirror.

In an advantageous embodiment of the invention, the central axis of the liquid flow coincides with the central axis of the acoustic beam.

The arrangement of the invention works as follows: during filling, acoustic pulses are passed through the liquid flow to the fluid level in the tank being filled (arrow C). The interruption of the flow at the liquid surface in the tank or storage container causes a reflection structure. The reflected signal is passed back through the flow to the transducer 1 (arrow D) where it is detected in any suitable manner. The reflected signal can also be detected by a separate transducer.

As soon as it has been determined that a given liquid level in the storage container has been reached, measures can be taken to shut off the fuel supply in good time (ie. without spillage). For example, the detection of the liquid level can serve as a control mechanism for the flow rate of admitted liquid.

This can prevent spillage on the one hand and premature cutoff on the other hand and thus enable the tank to be filled more quickly.

It will be clear that the invention is not restricted to early detection of a fuel level in a fuel tank, but can be used for any fluid in a tank to be filled, whereby an acoustic reflection can occur.

Various modifications of the present invention will become apparent to those skilled in the art. Such modifications are intended to fall within the scope of the appended claims.

I claim:

1. A method for detecting fluid level in a tank or storage container being filled, the fluid level being detected at a distance in front of the opening of a filling means, wherein an acoustic signal is passed from a transmitter through the fluid flow in the filling means and from the filling means to the fluid in the tank or storage container being filled, wherein an echo signal resulting from the reflection of the transmitted acoustic signal at the fluid surface in the tank or storage container is passed back through the fluid flow from the filling means and into the filling means to a receiver, thereby enabling the fluid level in the tank or storage container to be detected.

2. The method as claimed in claim 1, wherein the fluid flow from the filling means is interrupted as soon as a certain fluid level is reached in the tank or storage container being filled.

3. The method as claimed in claim 1 or 2, wherein the acoustic signal is an ultrasonic signal.

4. The method as claimed in claim 3, wherein the transmitted acoustic signals are coupled with the fluid flow inside the filling means.

5. The method as claimed in claim 3, wherein the transmitted acoustic signals are coupled in the fluid flow from the filling means via a mirror.

6. The method as claimed in claim 3, wherein the transmitted acoustic signals are coupled with the fluid flow in the outlet of the filling means directed towards the tank or storage container.

7. The method as claimed in claim 3, wherein the central axis of the acoustic beam coincides with the central axis of the fluid flow from the filling means.

8. The method as claim in claim 1 or 2, wherein the transmitted acoustic signals are coupled with the fluid flow inside the filling means.

9. The method as claimed in claim 8, wherein the central axis of the acoustic beam coincides with the central axis of the fluid flow from the filling means.

10. The method as claimed in claim 1 or 2, wherein the transmitted acoustic signals are coupled in the fluid flow from the filling means via a mirror.

11. The method as claimed in claim 10, wherein the central axis of the acoustic beam coincides with the central axis of the fluid flow from the filling means.

12. The method as claimed in claim 1 or 2, wherein the transmitted acoustic signals are coupled with the fluid flow in the outlet of the filling means directed towards the tank or storage container.

13. The method as claimed in claim 12, wherein the central axis of the acoustic beam coincides with the central axis of the fluid flow from the filling means.

14. The method as claimed in claim 1 or 2, wherein the central axis of the acoustic beam coincides with the central axis of the fluid flow from the filling means.

15. An apparatus for detecting the fluid level in a tank or storage container being filled, the fluid level being detected at a distance in front of the opening of a filling means, comprising an acoustic transmitter and a receiver, means for passing acoustic signals through the fluid flow in the filling means and from the filling means to and from the fluid surface in the tank or storage container being filled, and means for detecting the fluid level in the tank or storage container being filled form the acoustic signals passed back from the fluid surface in the tank or storage container through the fluid flow from the filling means and into the filling means to the receiver.

16. The apparatus as claimed in claim 15, wherein means are provided for interrupting the fluid flow from the filling means as soon as a certain fluid level is reached in the storage container.

17. The apparatus as claimed in claim 16, wherein the acoustic transmitter and the acoustic receiver are ultrasonic.

18. The apparatus as claimed in claim 16 or 17, wherein the transmitter and the receiver are fitted inside the filling means.

19. The apparatus as claimed in claim 18, further comprising a housing provided with a piezoelectric acoustic transducer, as well as a filling fluid inlet and a filling fluid outlet, the incoming fluid being passed through the acoustic beam with the aid of a circular means fitted in the housing and a flow smoothing means fitted in the housing.

20. The apparatus as claimed in claim 16 or 17, wherein the transmitter and the receiver are fitted in the outlet of the filling means directed towards the tank or storage container.

21. The apparatus as claimed in claim 20, further comprising a housing provided with a piezoelectric acoustic transducer, as well as a filling fluid inlet and a filling fluid outlet, the incoming fluid being passed through the acoustic beam with the aid of a circular means fitted in the housing and a flow smoothing means fitted in the housing.

22. The apparatus as claimed in claim 9 or 10, further comprising an mirror for coupling the acoustic signals with the filling fluid flow.

23. The apparatus as claimed in claim 22, further comprising a housing provided with a piezoelectric acoustic transducer, as well as a filling fluid inlet and a filling fluid outlet, the incoming fluid being passed through the acoustic beam with the aid of a circular means fitted in the housing and a flow smoothing means fitted in the housing.

24. The apparatus as claimed in any one of claims 15-17, further comprising a housing, provided with a piezoelectric acoustic transducer, as well as a filling fluid inlet and a filling fluid outlet, the incoming fluid being passed through the acoustic beam with the aid of a circulator means fitted in the housing and a flow smoothing means fitted in the housing.

25. The apparatus as claimed in claim 24, wherein the housing, the circulator means and the flow smoothing means are cylindrical.

26. The apparatus as claimed in claim 25, wherein the central axis of the acoustic beam coincides with the central axis of the fluid flow from the filling means.

27. The apparatus as claimed in claim 26, wherein the outlet is tapered.

* * * * *